United States Patent [19]

Meyer

[11] 3,839,005

[45] Oct. 1, 1974

[54] LASER BEAM SEVERING OF A ROTATING ARTICLE

[75] Inventor: Richard W. Meyer, Toledo, Ohio

[73] Assignee: Owens-Illinois, Inc., Toledo, Ohio

[22] Filed: Nov. 6, 1972

[21] Appl. No.: 304,042

Related U.S. Application Data

[63] Continuation-in-part of Ser. No. 140,736, May 6, 1971, abandoned.

[52] U.S. Cl................... 65/112, 65/113, 219/121 L
[51] Int. Cl.......................... C03b 21/00, B23k 9/00
[58] Field of Search ............ 65/112, 120, 174, 113, 65/DIG. 4; 219/121 L, 121 LM

[56] References Cited
UNITED STATES PATENTS

| | | | |
|---|---|---|---|
| 3,419,321 | 12/1968 | Barber et al. ..................... | 65/174 X |
| 3,453,097 | 6/1969 | Hafiyer ............................ | 65/112 X |
| 3,601,576 | 8/1971 | Schlafli ............................ | 65/112 X |
| 3,696,504 | 10/1972 | Cupler............................. | 219/121 L |
| 3,701,880 | 10/1972 | Rively et al...................... | 65/174 X |
| 3,740,524 | 6/1973 | Dahlberg ......................... | 65/112 X |

OTHER PUBLICATIONS

Ceramic Bulletin Vol. 52, No. 11, (1973) Sribing Glass with Pulsed and O–Switched CO₂ Laser – by Mansoor A. Saifi and Un–Chul Paek – Pages 838–841.

*Primary Examiner*—S. Leon Bashore
*Assistant Examiner*—Frank W. Miga
*Attorney, Agent, or Firm*—Thomas A. Meehan; Edward J. Holler

[57] ABSTRACT

This application discloses the severing of rod-like and relatively thick walled hollow glass articles formed from relatively high expansion coefficient glasses, e.g., rod, tumblers, tubing, cathode ray bulbs and the like. Severing is accomplished by repeatedly rotating the article to be severed while directing, against the surface of the article, a relatively sharply focused intense beam of coherent radiant energy of a wavelength such that the article will absorb a substantial amount of the radiant energy. It has been found that glass is highly opaque to, or highly absorptive of, radiant energy of a wavelength of 10.6 microns, and coherent radiant energy of this type may be conveniently provided by a laser of the $CO_2$ type, which equipment is available from commercial sources. The article being severed must be rotated sufficiently rapidly to prevent the laser from damaging or burning the surface thereof by localized overheating. Severing of the article is effected by cracking along the line repeatedly traced by the laser beam, the cracking being caused by the temperature differential between the glass along this line and glass in regions closely proximate thereto. The development of temperature differentials in glass articles satisfactory for cracking is relatively easy to accomplish due to the relatively poor thermal conductivity of glass and the relatively poor strength of glass in tension.

4 Claims, 2 Drawing Figures

PATENTED OCT 1 1974  3,839,005

LASER BEAM SEVERING OF A ROTATING ARTICLE

RELATED APPLICATION

This application is a continuation-in-part of my copending application, Ser. No. 140,736 filed May 6, 1971, now abandoned.

BACKGROUND OF THE INVENTION

It is known that rod-like and hollow glass articles can be severed along a predetermined line of endless character by thermal stress cracking caused by the application of heat to the article in a pattern more or less concentrated along such line, usually followed by applying mechanical force to the heated area. Heretofore, such heating has been predominantly accomplished by the impingement of a burner flame against such article along such line, and the prior art has been provided with a wide variety of special burners designed to concentrate the flame against the smallest possible area of the article being severed. Notwithstanding the advances which have been made in combustion technology, known intense flame burner designs for severing such glass articles still result in the application of heat to the article in a spot pattern of finite area. This results, when the article and flame are rotated relative to one another, in the heating of the article in the pattern of a ring of finite depth, thereby making it difficult to sever the article along an accurately positioned line within such pattern and leading to heat damage effects, e.g., distortion, to the newly formed edge of the severed article.

According to present invention, however, a rod-like or relatively thick-walled hollow glass article may be cleanly severed along an extremely accurately located line, with no visible distortion or damage to the edge or surface of the severed article, by effecting relatively rapid and repeated rotation of the article with respect to a highly concentrated laser beam of a wave length to which the glass article is absorptive, which beam is relatively sharply focused to a relatively small spot on the outer surface of the wall, or inner surface of a hollow article, to thereby cause the laser beam to repeatedly trace the same linear pattern around the article until the temperature of the article along this line, relative to the temperature of adjacent regions, reaches the point where the stresses caused by the temperature differential will cause the article to crack cleanly along the heated line. In ambient surroundings, the invention can be, and preferably is, practiced under such circumstances that the temperature of the portion of the article along the line traced by the laser beam may be maintained below that which will cause that portion of the article to show visible color. This technique differs from laser burning techniques practiced with relatively thin-walled hollow glassware (up to 0.025 in. thickness) because such burning would cause intolerable surface and/or edge damage in, e.g., tumblers, which range in wall thickness from 0.025 – 0.030 in. for premium thinware to 0.040 – 0.060 in. for standard ware.

The present invention can be used to advantage in severing a smooth surfaced glass article which is circular in transverse cross-section, at least in the region of the severing line, and which is rotated about its longitudinal central axis as by a mechine-tool type driven chuck, e.g., to cut a length of glass rod, tubing or pipe from a greater length of such material or to sever the moil-containing rim portion from a drinking tumbler to form a smooth unbeaded drinking edge similar to that characteristic of expensive imported tableware. In practicing the invention in the severing of articles formed from soda-lime or other relatively high coefficient of thermal expansion glass compositions, the severing can be accomplished entirely by the present invention, without the need for mechanical assistance in the way of pre-scoring or scribing or tensile stressing. In dealing with glass products other than smooth surfaced circular products, it is normally necessary to provide means to change the focal point of the laser beam as the product rotates to avoid directing the beam in a large spot or area pattern against any portion of the article, such area pattern making it difficult to concentrate the heating effect where desired and creating the danger of damaging the product by burning. With a special round-cornered rectangular glass cathode-ray bulb it has been found that the face plate can be severed from the integrally-cast funnel along a line spaced slightly in back of the face plate, by using a pair of $CO_2$ lasers, one focused between the surfaces of the wall in a region in the midpoint of the longer side and the other focused between the surfaces of the wall in a region of the corner of the bulb. While some "area-heating" damage coule be detected in other regions of the tube, it was not unacceptable for the application in question, although it would not have been acceptable for purposes of drinking tumbler manufacture. The problem could, of course, be entirely avoided by a more complicated set-up designed to vary the focal point of the laser with the rotation of the bulb to maintain the laser focus between the surfaces of the bulb wall at all times during the heating step.

It has also been determined that a laser beam crack-off arrangement, as described above, can be enhanced in certain circumstances by directing a small natural gas flame normal to the laser beam axis and just out of contact with the surface the glass article being severed. This can be accomplished by using a hypodermic syringe as the gas metering device.

Accordingly, it is the object of the present invention to provide method and apparatus for severing rod-like and hollow glass article with improved precision and improved edge characteristics.

It is a further object of this invention to provide method and apparatus for circumferentially severing rod-like and hollow glass articles by means of a laser beam without detectable damage to the edge or adjacent surface portions of the severed article and without adding to the permanent stress level of the edge of the article.

Further objects and a better understanding of the present invention will be apparent from the following description of the drawing the detailed description of the invention and the claims.

DESCRIPTION OF THE INVENTION

Figure 1:
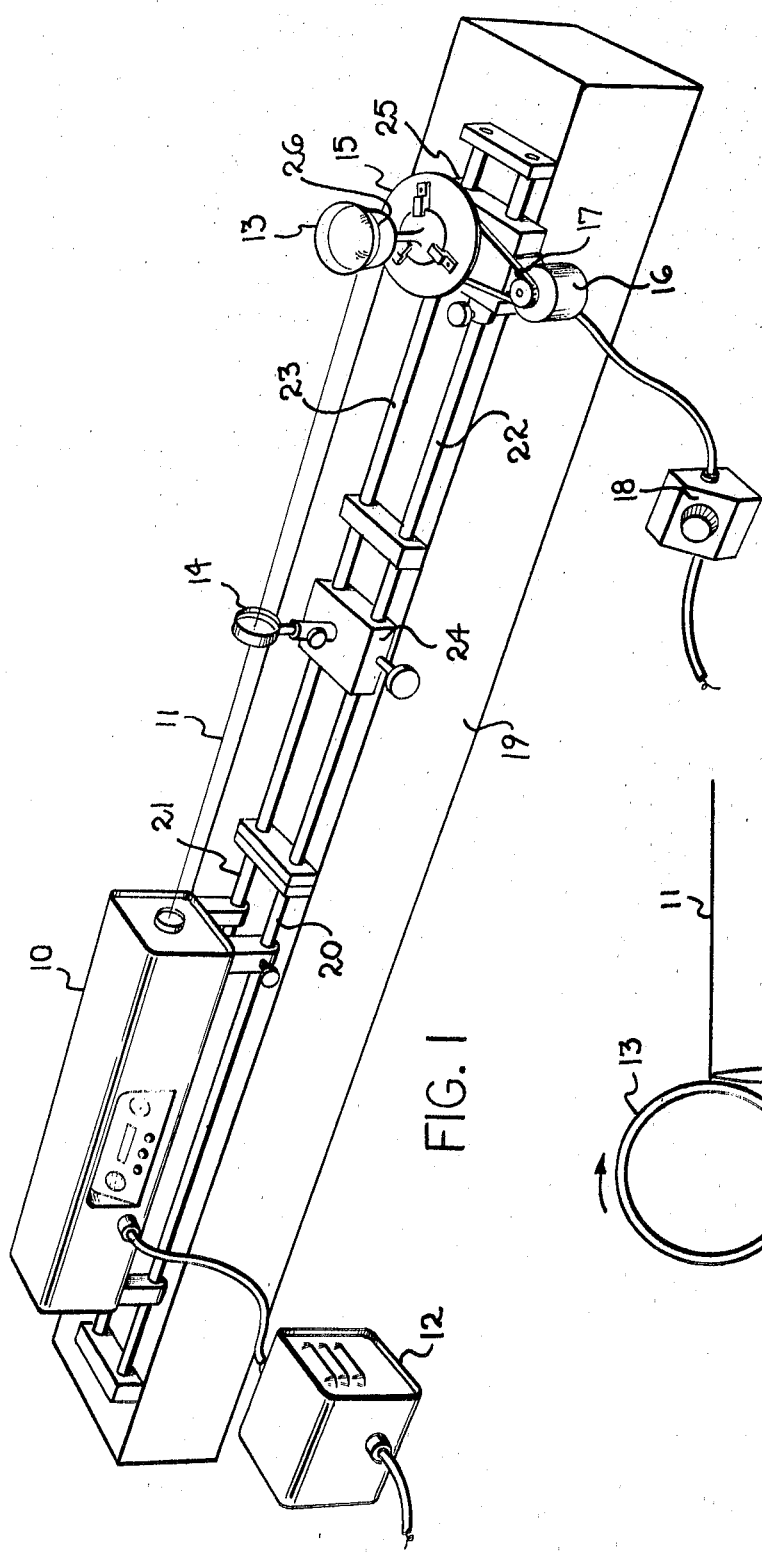
FIG. 1 is a perspective layout view of an embodiment of apparatus according to the present invention.

As is shown in FIG. 1 of the drawing, apparatus according to the present invention comprises a laser beam generator 10 of the $CO_2$ type for producing an intense, highly coherent beam 11 of electromagnetic radiant energy of a wavelength of 10.6 microns, a wavelength to which a wide variety of glass compositions are highly absorptive or opaque (i.e., they are not substantially transparent to radiant energy of this frequency). Laser 10, which receives electrical power through a transformer 12, is of a commercially available type and its construction details do not comprise a feature of the present invention. For example, the invention has heretofore been successfully practiced with an alternating current powered $CO_2$ type laser unit made by Perkin Elmer Corporation, their Model No. 6200, rated at 50 Watt power output 60 cycle. Direct current devices would also be satisfactory.

Laser beam 11 is directed against a drinking glass 13, shown as a footed goblet, from which a portion, e.g., the moil-containing rim portion, is to be severed. The laser beam is relatively sharply focused against the outer surface of the portion of the wall of article 13 which is in the path of the laser by interposing an optical lens 14 between laser unit 11 and article 13. Optical lens 14 is constructed of a material that is transmissive to light of the wavelength generated by the laser unit. For example, light of a wavelength of 10.6 microns, as is generated by a $CO_2$ type laser, will pass freely through a germanium lens and such a lens can transmit enough energy for the intended glass cracking function without being damaged thereby. Alternatively, a polycrystalline zinc sulfide lens, such as a Kodak "Irtran 2" lens, or a polycrystalline zinc selenide lens, such as a Kodak "Irtran 4" lens can also be used. To set the focus of the lens 14, it is noted that good results have been obtained with a laser slightly defocused to a spot size of the order of 0.008 inch or slightly larger on the outer surface of the article, from a spot size of 0.00042 inch at theoretical focus. For a 50 m.m. focal length lens, this may be obtained with a lens to article spacing of 53 m.m.

Article 13 is mounted in a rotatable fixture or chuck 15 with its vertical central axis aligned with the axis of rotation of the fixture. The fixture is caused to rotate around its central axis by appropriate means, for example and electrical motor 16 and V-belt drive 17, the rotational speed being manually adjustable by means of a Variac voltage regulator 18 in the electrical circuit of the motor 16.

Laser unit 10, lens 14 and fixture 15 are mounted on a common table 19 which is designed to absorb vibrations from the laser unit and the rotating chuck 15 to prevent movement of the focused laser beam 11 on article 13. The position of laser unit 10, longitudinally of the laser beam 11, is adjustable, the adjustability being attained by mounting laser unit 10 on a pair of spaced apart, parallel mounting rods 20 and 21, each of which is securely affixed at its opposite ends to table 19. A similar pair of mounting rods 22 and 23 is provided for the mounting of lens 14, in its holding fixture 24, and rotatable article 13, in its holding fixture 15, to permit adjustment of the positions of lens 14 and article 13 longitudinally of the laser beam 11. Lens 14 and article 13 are mounted on rods which are separate from the rods on which laser unit 11 are mounted to help isolate the lens and article from the vibrations of the laser. Of course, for safety reasons, appropriate shielding, not shown, will be included with the illustrated set-up to protect the operator from the possible injurious effects of stray or reflected portions of the laser beam.

In operation, rotation of fixture 15 is started before laser unit 10 is powered. After laser unit 10 is powered, laser beam 11 will trace a circumferential line of substantially infinitesimal thickness on rotating article 13 and continued rotation will cause laser beam 11 to repeatedly retrace this line until sufficient heat has developed along this line to cause the end portion of the article to crack off cleanly from the remainder thereof due to thermal stresses.

By maintaining the rotational speed of fixture 15 relatively high in relationship to the power of laser unit 11, it is possible to obtain a very clean and even crack off in a relatively short period of time with no apparent burning of the edge of the severed article and with a lower count of glass particles in the completed article than that obtained with well practiced conventional thermal crack-off processes.

In the practice of the invention to date it has been found possible to satisfactorily sever glass articles with $CO_2$ laser units rated from 50 to 200 watts, with the crack off time being an inverse function of laser power (e.g., for 0.040 inch wall, 1⅜ inch. O.D. glass tubing, about 6 seconds exposure to a 45 watt $CO_2$ laser beam versus 2.9 seconds at 100 watts). Higher power laser units create a severe problem of damaging the glass article in the region adjacent the newly-formed edge by melting or volatilizing the glass in this region. Satisfactory severing can be accomplished, at the laser beam powers employed, at article rotational speeds of the order of 200 r.p.m. Higher speeds, up to 900 r.p.m., have been tried with some noted improvement in cycle time and severed edge quality. As a rule, higher speeds are preferred for higher power lasers and vice versa, the important consideration being to rotate the article sufficiently rapidly to prevent energy buildup in any portion thereof from reaching the point where the beam would burn through the wall. Glasses satisfactorily severed in this manner include soda-lime and other glasses whose coefficient of thermal expansion is approximately $50 \times 10^{-7}$ in/in/°C or greater, although a low expansion borosilicate glass of an expansion coefficient of $33 \times 10^{-7}$ in/in/°C was severed in this manner with the use of an auxiliary air jet directed against the portion of the article being heated. With regard to glass compositions which possess expansion coefficients not substantially in excess of $50 \times 10^{-7}$ in/in/°C, there is some indication of improved severing in the practice of the present invention from the point of view of reduced chipping, from the use of a cylindrical lense to flatten out the laser beam from a circular to a more lineal pattern extending along the desired line of separation. It is believed that this feathers out the energy distribution in the beam for more gentle or gradual energy build-up against the rotating article.

In general, there appears to be a relationship between laser energy density, article wall thickness and speed of rotation such that the product of speed of rotation and energy density is a constant for each size wall thickness. It is also recommended that the speed of rotation be coordinated with frequency, of an a.c. powered laser, so that the points which are most intensely heated during successive rotations do not coincide, viz., heating should be asynchronous.

In addition to the practice of the invention with respect to drinking glasses, glass tubing and glass cathode-ray bulbs, as hereinbefore described, the invention has been satisfactorily practiced in the severing of solid glass rod to a diameter of ⅜ in. It is also to be noted that the article severed could be provided with a severed edge which does not lie entirely in a common plane by providing means, not shown, to impart oscillatory movement to the article along its axis of rotation during such rotation, which oscillatory movement, of course, must be synchronized with the speed of rotation of the article.

Figure 2:
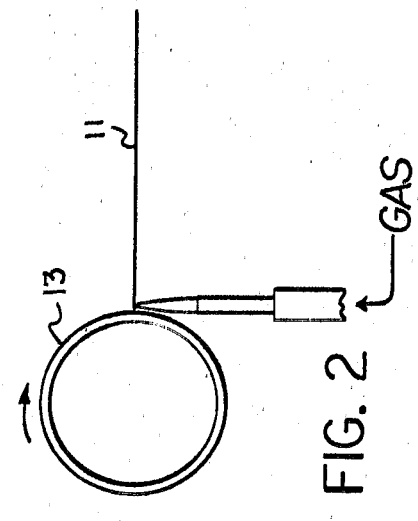
FIG. 2 is a schematic plan view of a fragmentary portion of a modified embodiment of apparatus according to the present invention.

FIG. 2 illustrates an alternative arrangement in which the laser beam heating effect on rotating glass article 13, from a laser beam 11, as heretofore described can be enhanced by directing a flame from a small gas burner 31 against the article at a point on the line repeatedly traced on the article by the laser beam. At natural gas flow rates of the order of 25–340 cubic centimeters per minute of natural gas at 10 in. w.c.; some improvement in cycle times was noted without any offsetting reduction in quality of the severed edge of the glass article. A flat tip hypodermic syringe was used as the burner element in such an arrangement.

It is believed that the best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

I claim:

1. The method of severing a portion of a rod-like or relatively thick-walled hollow glass article from the remainder of the original portion without visible damage to the edge or adjacent surface portions thereof, said glass article being formed from a glass composition whose coefficient of expansion is not substantially lower than that of soda-lime glass, said method comprising the steps of:

emitting a laser beam at a wavelength of 10.6 microns by an alternating current $CO_2$ type laser unit at a power not substantially less than 20 watts nor substantially higher than 500 watts, said laser beam, at such wavelength, being absorbed to a substantial degree by glass;

interposing the glass article in the path of the laser beam;

focusing the laser beam to a very small spot on the desired line of severence of the glass article; and rotating the article about its longitudinal center axis at a speed not substantially lower than 200 revolutions per minute at all times while the laser beam is impinging thereagainst to cause the laser beam to repeatedly trace a circumferential pattern about the glass article, said pattern being coincident with the desired line of separation of said portion from said remainder, said rotation being continued until the heating effect of said laser beam along said desired line of separation is sufficient to establish thermal stresses in said article which are sufficient to cause said article to crack cleanly along said line, said severing being effected entirely by thermal stresses in the glass article established by the impingement of the laser beam against the rotating article, the temperature of the article along the line of separation remaining below the temperature where the article will show color at all times during the impingement of the laser thereagainst, the separated portion of the article being characterized by a rim immediately adjacent the line of separation which is substantially free of the visible effects of overheating.

2. The method according to claim 1 and further comprising directing a flame from a small gas burner adjacent the rotating glass article at a point on said desired line of separation.

3. The method of claim 1 wherein said article is rotated at a rotational speed not substantially higher than 900 revolutions per minute.

4. The method according to claim 1 wherein the article is rotated at a speed of rotation which is asynchronously related to the a.c. excitation frequency of the laser beam emitted by the alternating current laser unit.

* * * * *